(12) United States Patent
Werth

(10) Patent No.: US 7,295,000 B2
(45) Date of Patent: Nov. 13, 2007

(54) METHOD FOR DETECTING DISTURBANCES WHEN DETERMINING THE ROTATIONAL SPEED OF A ROTOR AND EVALUATION CIRCUIT

(75) Inventor: Tobias Werth, Villach (AT)

(73) Assignee: Infineon Technologies AG, Munich (DE)

(*) Notice: Subject to any disclaimer, the term of this patent is extended or adjusted under 35 U.S.C. 154(b) by 194 days.

(21) Appl. No.: 11/140,590

(22) Filed: May 27, 2005

(65) Prior Publication Data

US 2005/0278136 A1  Dec. 15, 2005

(30) Foreign Application Priority Data

May 26, 2004  (DE) .................. 10 2004 025 776

(51) Int. Cl.
*G01P 3/42* (2006.01)
*G01B 7/30* (2006.01)

(52) U.S. Cl. ............... 324/166; 324/160; 324/207.25; 702/145

(58) Field of Classification Search ........... 324/207.25, 324/160, 166; 73/514.31, 514.39; 702/142, 702/145
See application file for complete search history.

(56) References Cited

U.S. PATENT DOCUMENTS

| 5,099,197 A | 3/1992 | Hauck et al. |
| 6,242,905 B1 | 6/2001 | Draxelmayr |
| 2005/0024042 A1 | 2/2005 | Block et al. |
| 2005/0068023 A1 | 3/2005 | Walter et al. |
| 2005/0122098 A1 | 6/2005 | Block et al. |

FOREIGN PATENT DOCUMENTS

| DE | 38 15 530 A1 | 11/1989 |
| DE | 197 17 364 C1 | 8/1998 |
| WO | WO 03/098229 A1 | 11/2003 |
| WO | WO 03/098230 A1 | 11/2003 |
| WO | WO 03/100352 A1 | 12/2003 |

*Primary Examiner*—Bot LeDynh
(74) *Attorney, Agent, or Firm*—Maginot, Moore & Beck

(57) ABSTRACT

The invention relates to a rotary encoder and to a method for detecting disturbances in such a rotary encoder. In this case, vibrations or other disturbances are detected by means of the phase difference between a rotational speed signal, which represents a rotational speed of a rotor, and a direction of rotation signal, which represents a direction of rotation of the rotor.

11 Claims, 4 Drawing Sheets

METHOD FOR DETECTING DISTURBANCES WHEN DETERMINING THE ROTATIONAL SPEED OF A ROTOR AND EVALUATION CIRCUIT

BACKGROUND

The invention relates to a method for detecting disturbances when determining the rotational speed of a rotor and to an evaluation circuit for a rotary encoder. Rotary encoders are used to determine the rotational speed, the direction of rotation and the angle of rotation of a rotor with respect to a sensor arrangement. Rotary encoders of this type are used in a wide variety of industrial sectors, in particular in drive technology FIG. 1 shows a rotor 1, which is designed for example as a metallic gearwheel with teeth 2, of a rotary encoder. A sensor arrangement comprising sensors 31, 32 and 33 is situated at a distance d from the rotor 1. Said sensors 31, 32, 33 may be designed for example as Hall sensors or as inductive proximity switches.

As a result of a rotation of the rotor 1 about its shaft 3, the sensor arrangement generates a phase signal on account of the teeth 2 of the rotor 1 moving past the sensors 31, 32, 33. In the case of a uniform undisturbed rotation of the rotor, each of the sensors 31, 32, 33 supplies a periodic phase signal, which, depending on the concrete configuration of the sensor, may be a sinusoidal signal or a square-wave signal. An item of information about the rotational speed of the rotor can be inferred directly from said phase signals by determining the zero crossings, in which case the number of teeth of the wheel is to be taken into account.

A possible procedure for generating a first rotational speed signal, which contains an item of rotational speed information, and a first direction of rotation signal, which contains an item of direction of rotation information, is illustrated in FIG. 2. An arrangement in accordance with FIG. 2 is described in DE 197 17 364 C1. The sensors 31, 32, 33 respectively represent a first, a second and a third signal source, which respectively output a phase signal S3, S4 and S5. The outputs 315 and 335 of the first and third signal sources 31 and 33, respectively, are connected to the first input 101 and the second input 102, respectively, of a first subtractor 10, which forms the difference between the first phase signal S3 and the third phase signal S5 and outputs this difference as a first rotational speed signal S1 at its output 105.

The first phase signal S3 and the third phase signal S5 are formed for example as sinusoidal signal or as square-wave signal with a duty ratio of 1:1, and have a phase difference 180° and also the same amplitude. In this case, the first rotational speed signal S1 is likewise formed in sinusoidal or square-wave fashion, the amplitude being doubled compared with the first or third phase signal S3 or S5, respectively.

In order to generate a first direction of rotation signal S2, firstly the first phase signal S3 and the third phase signal S5 are fed to the first and second inputs 111 and 112, respectively, of a first adder 11. The signal present at the output 115 thereof is passed to the input 141 of an amplifier 14, which multiplies the amplitude of the signal by a factor of 0.5 and outputs the thereby attenuated signal at its output 145. A second subtractor 12 forms the difference between said attenuated signal and the second phase signal S4 output by the second signal source 32. The corresponding difference signal is output at the output 125 of the second subtractor 12 and forms the first direction of rotation signal S2.

In the case where the signal sources 31, 32, 33 are suitably laterally spaced apart with respect to the teeth 2 of the rotor 1 illustrated in FIG. 1, the first rotational speed signal S1 and the first direction of rotation signal S2 have a phase difference of +90° or −90°, it being possible, in principle, to set arbitrary phase differences. In this case, the sign of this phase difference depends on the direction of rotation of the rotor 1 shown in FIG. 1.

A typical temporal profile of a first rotational speed signal S1 and of a first direction of rotation signal S2 is illustrated schematically in FIG. 3. Both signals are sinusoidal, the amplitude of the first rotational speed signal S1 being twice as large as the amplitude of the first direction of rotation signal S2.

The two signals S1 and S2 have a phase difference $\Delta\phi1$. In the example explained, the phase difference $\Delta\phi1$ is ascertained by means of the distance between the zero crossings of the first rotational speed signal S1 at a first instant t1 and the succeeding zero crossing of the first direction of rotation signal S2, in each case with a falling signal. A further possibility for ascertaining the phase difference $\Delta\phi1$ consists e.g. in using a zero crossing of the first rotational speed signal S1 as first instant t1, determining the amplitude of the first direction of rotation signal S2 at this instant t1 and calculating the phase difference $\Delta\phi1$ by means of a known correlation between amplitude and phase of the direction of rotation signal S2.

Disturbances may be superposed on the first rotational speed signal S1 and the first direction of rotation signal S2, which disturbances can adversely influence the measurement result. Disturbances of this type include for example so-called distance oscillations, as a result of which the distance d between the rotor 1 and the sensor arrangement 31, 32, 33 changes, or rotary oscillations of the rotor, by means of which the rotor 1 oscillates about its instantaneous angular position during the rotation about its shaft 3. Disturbances of this type alter the phase signals output by the sensors 31, 32, 33.

As long as the rotor rotates uniformly in a direction of rotation and as long as there is no disturbance present, the phase difference between the first rotational speed signal S1 and the first direction of rotation signal S2 is constant. A change in the rotational speed or the direction of rotation gives rise firstly to a temporal change in the phase difference, which is generally small in comparison with the phase differences caused by relevant disturbances, so that in general a differentiation is possible.

WO 03/098229 A1 discloses a method and an arrangement for ascertaining rotational speed, in which the switching hysteresis is adapted dynamically in a manner dependent on the distance between the sensor arrangement and the rotor.

WO 03/098230 A1 shows a method and an arrangement for detecting the movement of an element, in which the pulses output by a sensor arrangement are summed in a direction-dependent manner by means of an up/down counter. If the sensor arrangement generates counting pulses brought about by a vibration, then said pulses are essentially averaged to a counter value close to zero.

WO 03/100352 A1 discloses a method and an arrangement for detecting the movement of an element relative to a sensor arrangement, in which the phase responses of individual sensor elements and of the difference signal of the individual sensor elements, for identifying vibrations, are evaluated in respect of whether all three signals are in phase.

SUMMARY

It is an object of the present invention to provide a method for detecting disturbances when determining the rotational speed of a rotor and an evaluation circuit that is able to identify disturbances of this type.

The method for detecting disturbances when determining the rotational speed of a rotor and/or the direction of rotation of the rotor provides for providing a first rotational speed signal, which represents a rotational speed of the rotor, providing a first direction of rotation signal, which represents a direction of rotation of the rotor, and determining the phase difference between the first rotational speed signal and the first direction of rotation signal in order to detect disturbances.

The basic concept of the invention thus consists in deducing a disturbance of the type mentioned in the introduction from the phase difference between the first rotational speed signal and the first direction of rotation signal. In this case, the first direction of rotation signal and the first rotational speed signal may be generated for example from sensor signals in the manner explained in the introduction.

The rotational speed signal and the direction of rotation signal may be present as periodic signals, for example as sinusoidal signals, and preferably have the same frequency at least in the undisturbed state. However, the frequency of the rotational speed signal may also be an integral multiple of the frequency of the direction of rotation signal, or the frequency of the direction of rotation signal may be an integral multiple of the frequency of the rotational speed signal. In the case of an undisturbed rotation of the rotor in a specific direction, this results in a temporally constant, rotational-speed-independent desired value of the phase difference between the rotational speed signal and the direction of rotation signal. If a disturbance occurs during operation, then the phase difference between the rotational speed signal and the direction of rotation signal changes. If the phase difference in this case falls below a predefined lower limit value or exceeds a predefined upper limit value, the presence of a disturbance can be deduced from this. In this case, the disturbance is regarded as all the more severe the greater the extent to which the phase difference deviates downward or upward from its desired value.

Depending on the type of disturbance, the phase difference between the first rotational speed signal and the first direction of rotation signal may decrease or increase as a result of the disturbance. In order to suppress the detection of non-relevant disturbances, it is provided that a phase difference that deviates from its desired value in the case of a specific direction of rotation is interpreted as a disturbance only when it falls below a predefined lower limit value or exceeds a predefined upper limit value. In this case, each direction of rotation can be assigned a lower or an upper limit value, respectively, the desired value for the relevant direction of rotation preferably, but not necessarily, being the average value between the lower and the upper limit value for this direction of rotation.

Optionally, it is also possible to define the limit value by means of a maximum permissible deviation from the desired value for a specific direction of rotation. By way of example, if the desired values of the phase difference are +90° in the case of a right-hand rotation and −90° in the case of a left-hand rotation and if the maximum permissible deviation of the phase difference from the desired value is 70°, then phase differences in the range of 20° to 160° are permissible in the case of a right-hand rotation and phase differences in the range of −160° to −20° are permissible in the case of a left-hand rotation without a disturbance being detected. The maximum permissible deviation of the phase difference from its desired value for a specific direction of rotation is preferably 70°.

In order to achieve an adaptation to various operating states, e.g. ones with different rotational speeds of the rotor, the lower and/or the upper limit value may be chosen in a manner dependent on the first rotational speed signal. By way of example, the lower and/or the upper limit values may be chosen such that they increase as the frequency of the rotational speed signal increases.

The phase difference between the rotational speed signal and the direction of rotation signal is preferably determined by determining a first and a second signal value of the first direction of rotation signal at two different instants. The difference between the first and the second signal value is a measure of the phase difference between the first rotational speed signal and the first direction of rotation signal. In this case, the first and/or the second instants are preferably ascertained in each case by means of a zero crossing, particularly preferably by means of successive zero crossings of the rotational speed signal. If the rotational speed signal is formed as a sinusoidal signal, for example, then the first instants may be ascertained in each case by means of the zero crossings in the case of a rising signal profile and the second instants may be ascertained in each case by means of zero crossings in the case of a falling signal profile.

The method for detecting disturbances can be employed when generating a rotational speed signal and/or a direction of rotation signal, by generating such a rotational speed signal and/or direction of rotation signal only when no disturbance is detected.

The evaluation circuit according to the invention for a rotary encoder comprises a first input for feeding in a first rotational speed signal, a second input for feeding in a first direction of rotation signal, a phase determining unit, which is designed to determine a phase difference between the first rotational speed signal and the first direction of rotation signal and to provide a phase difference signal, an assessment unit, to which the phase difference signal is fed and which is designed to output a status signal in a manner dependent on this phase difference signal. The evaluation circuit furthermore comprises a processing unit, to which the first rotational speed signal and/or the first direction of rotation signal are fed and which generates a second rotational speed signal in a manner dependent on the first rotational speed signal and/or a second direction of rotation signal in a manner dependent on the first direction of rotation signal.

The phase determining unit determines the phase difference between the first rotational speed signal and the first direction of rotation signal by ascertaining the signal values of the first direction of rotation signal at first and at second instants. In this case, the first and/or second instants are preferably ascertained by means of output signals of a zero crossing detector of the rotary encoder, which determines the zero crossings of the rotational speed signal.

In order to ascertain the signal values of the first direction of rotation signal at the first and second instants, it is advantageous if the rotary encoder has a first memory unit, which stores the signal values of the first direction of rotation signal at the first instants.

Correspondingly, the rotary encoder may also have a second memory unit, which is provided for storing signal values of the first direction of rotation signal at the second instants.

From the signal values of the first direction of rotation signal that have been determined in this way and stored, if appropriate, it is possible to deduce the phase difference between the first rotational speed signal and the first direction of rotation signal.

If a phase difference established by means of this method exceeds or falls below specific lower and/or upper limit values, then the presence of a disturbance can be deduced from this. Since it may be necessary to configure such limit values in a manner dependent on the rotational speed of the rotor, the rotary encoder optionally has a unit for ascertaining an upper and/or a lower limit value for the phase difference between the first rotational speed signal and the first direction of rotation signal in a manner dependent on the first rotational speed signal.

For generating and/or outputting a second rotational speed signal and/or a second direction of rotation signal, the processing unit of the rotary encoder may optionally comprise one or more signal generators. The fact of whether the signal generator generates and/or outputs the second rotational speed signal and/or the second direction of rotation signal can be made dependent on whether or not a disturbance has been detected.

The invention is illustrated below on the basis of exemplary embodiments and described in greater detail in drawings.

DESCRIPTION

In the figures, unless specified otherwise, identical reference symbols designate identical parts and signals with the same meaning.

Figure 1:
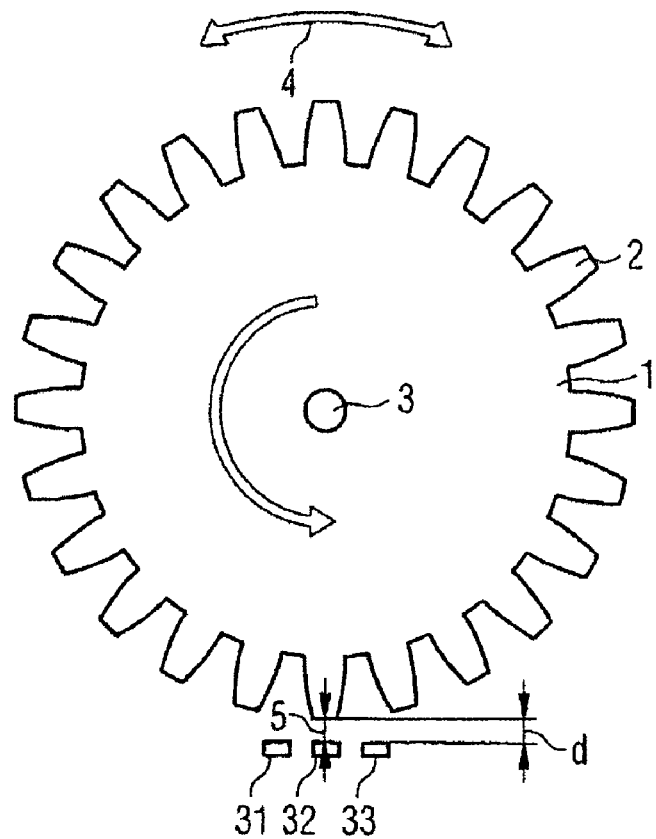
FIG. 1 shows a rotor according to the prior art, which rotor is arranged adjacent to a sensor arrangement and is subjected to disturbances, in side view.
Figure 2:
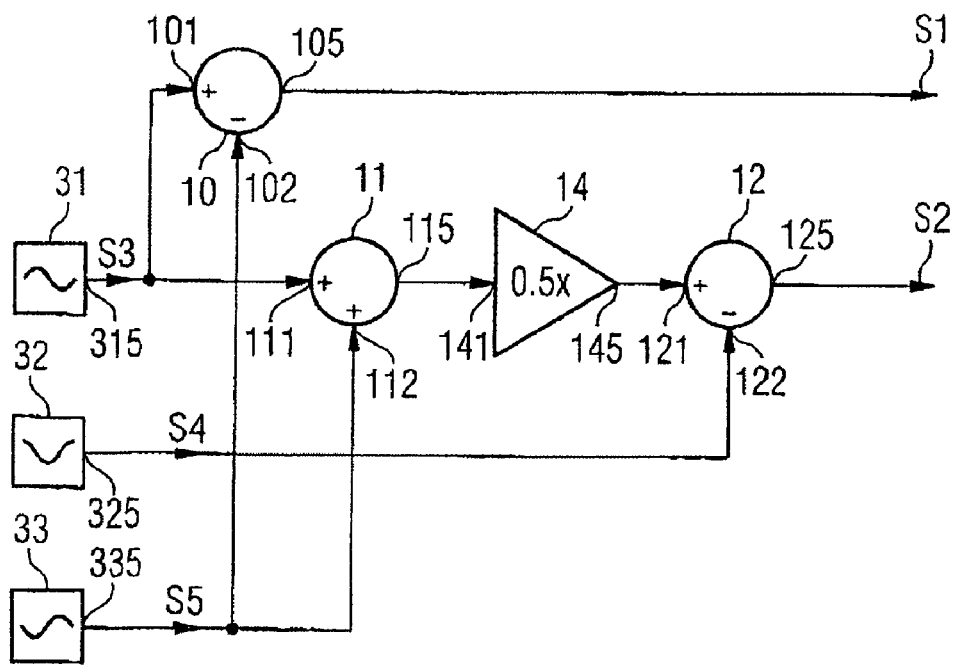
FIG. 2 shows an arrangement according to the prior art for generating a rotational speed signal and a direction of rotation signal from a plurality of sensor signals.

Referring to the explanations with respect to FIGS. 1 and 2, the determination of phase signals by means of a sensor arrangement according to FIG. 2 may be subject to disturbances. Disturbances of this type may be so-called distance oscillations, which lead to temporally variable distances between the rotor 1, serving as signal exciter, and the sensor 31, 32, 33. Alternatively, the disturbances may be rotary oscillations of the rotor 1 about its instantaneous angular position.

Figure 3:
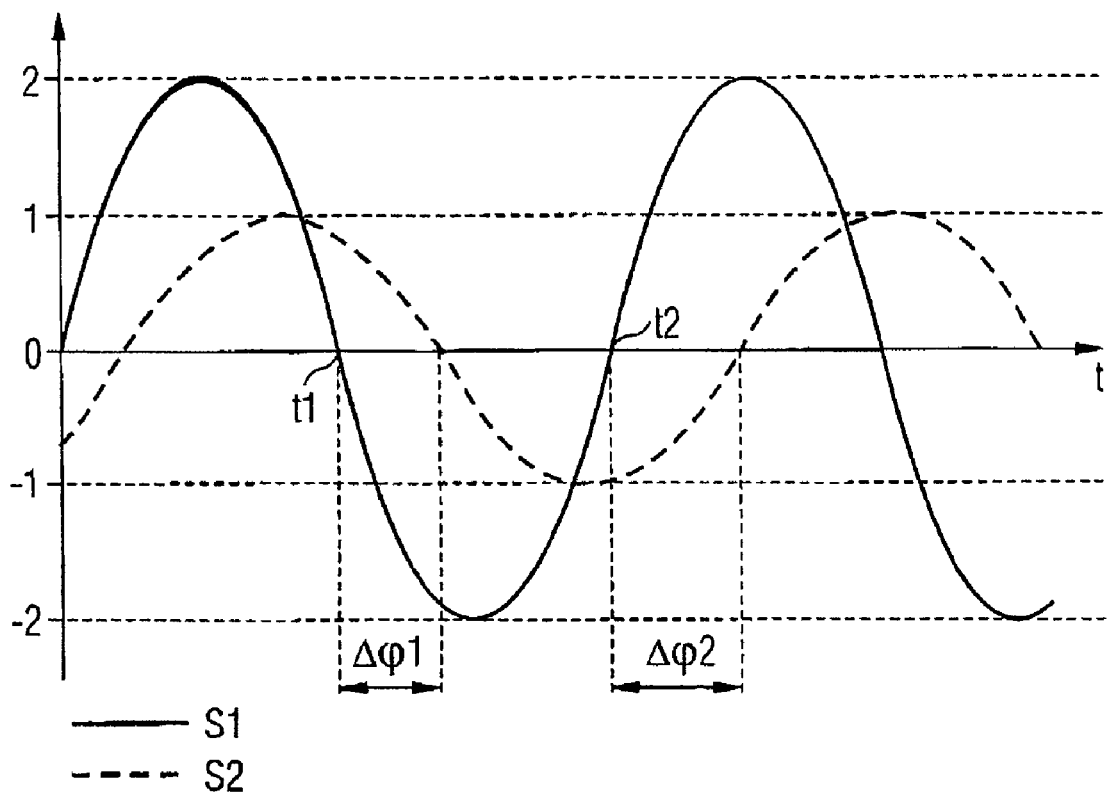
FIG. 3 illustrates by way of example the temporal profile of a rotational speed signal and of a direction of rotation signal.

Such disturbances give rise, in the temporal profile of the first rotational speed signal S1 and of the first direction of rotation signal S2, to changes in the phase difference between said signals S1, S2. The temporal profile for these two signals S1, S2 as illustrated in FIG. 3 manifests such a disturbance. The phase difference between the two signals S1, S2 is $\Delta\phi 1$ at a first instant, which is ascertained by means of a zero crossing of the first rotational speed signal S1 in the example. If the phase difference between the first rotational speed signal S1 and the first direction of rotation signal S2 is ascertained on the basis of a zero crossing of the first rotational speed signal S1 at a second instant t2, then a second phase difference $\Delta\phi 2$, different from $\Delta\phi 1$, results. The phase differences $\Delta\phi 1$, $\Delta\phi 2$ can assume positive or negative values depending on the direction of rotation of the rotor. In accordance with a preferred embodiment, the phase differences $\Delta\phi 1$, $\Delta\phi 2$ have different signs for different directions of rotation of the rotor. By way of example, in the undisturbed case, a phase difference of 90° may be present in the case of a right-hand rotation of the rotor and a phase difference of −90° in the case of a left-hand rotation.

It is possible in this way to obtain items of information about the direction of rotation of the rotor, in the undisturbed state, from the first direction of rotation signal in conjunction with the first rotational speed signal.

Furthermore, it is possible to obtain items of information about the rotational speed of the rotor, in the undisturbed state, from the first rotational speed signal, for example by evaluating the amplitude and/or the frequency of the first rotational speed signal, since these values may vary with the rotational speed of the rotor.

The invention provides, in order to detect disturbances when determining the rotational speed of a rotor and/or the direction of rotation of the rotor, for determining signal values of the first direction of rotation signal at first and at second instants in order to detect disturbances.

Figure 4:
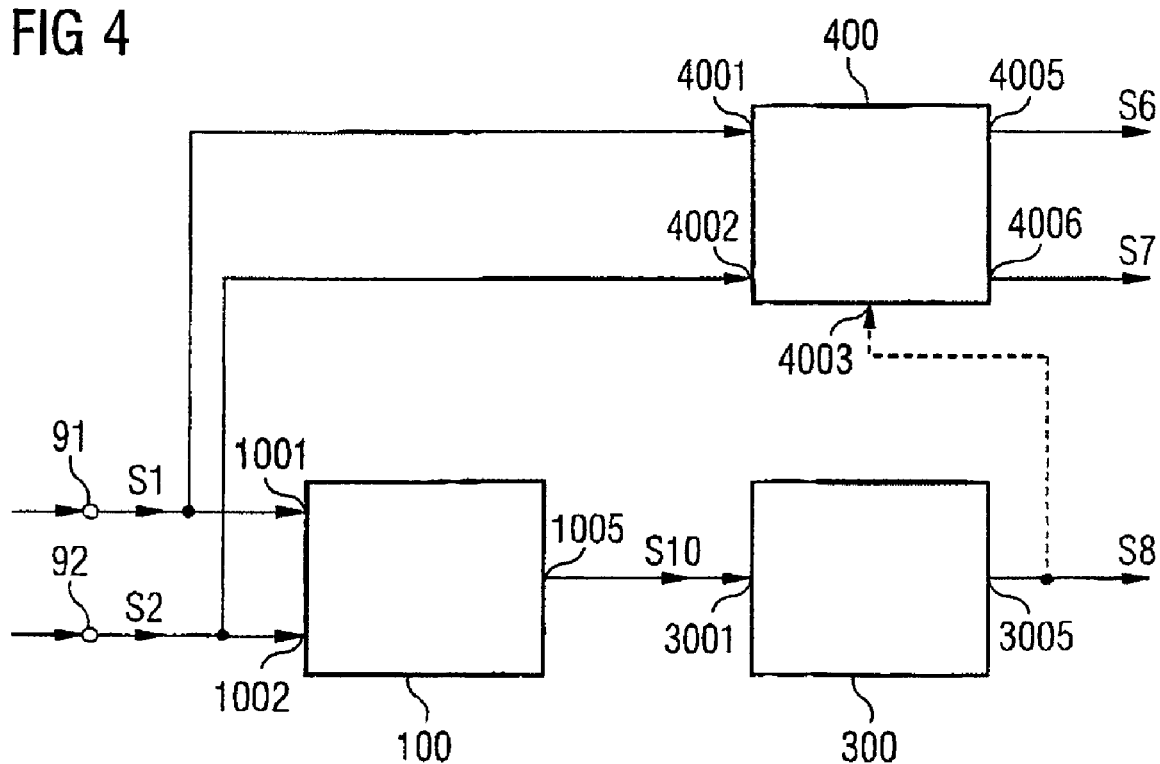
FIG. 4 shows a block diagram of a rotary encoder according to the invention, in which a second rotational speed signal, a second direction of rotation signal and also a status signal for indicating a disturbance are generated from a first rotational speed signal and a first direction of rotation signal.

FIG. 4 illustrates the block diagram of an evaluation circuit of a rotary encoder which realises such a method. The rotary encoder has a first input terminal 91, to which the first rotational speed signal S1 is fed, and a second input terminal 92, to which the first direction of rotation signal S2 is fed. The first rotational speed signal S1 and the first direction of rotation signal are generated for example by means of an arrangement explained with reference to FIGS. 1 and 2.

A first input 1001 of a phase determining unit 100 is connected to the first input terminal 91, and a second input 1002 of a phase determining unit 100 is connected to the second input 92. The phase determining unit 100 ascertains the phase difference between the first rotational speed signal S1 and the first direction of rotation signal S2 and provides a phase difference signal S10 at its output 1005. This phase difference signal S10 is fed to an input 3001 of an assessment unit 300, which provides a status signal S8 dependent on the phase difference signal S10 determined. The status signal S8 is output at the output 3005 of the assessment unit 300 and contains an item of information about whether a disturbance is present.

The first rotational speed signal S1 or the first direction of rotation signal S2 or, as illustrated in FIG. 4, both signals S1, S2 are fed to inputs of a processing unit 400. This processing unit 400 generates a second rotational speed signal S6 dependent on the first rotational speed signal S1 and/or a second direction of rotation signal S7 dependent on the first direction of rotation signal S2. The second rotational speed signal S6 and/or the second direction of rotation signal S7 are provided at outputs 4005 and 4006, respectively, of the processing unit 400.

Optionally, the second rotational speed signal S6 and/or the second direction of rotation signal S7 are generated in a manner dependent on the status signal S8. For this purpose, the status signal S8 is fed to the processing unit 400. Said processing unit 400 is designed for example to suppress the generation of the second rotational speed signal S6 and/or direction of rotation signal S7 if the status signal S8 indicates a detected disturbance.

Figure 5:
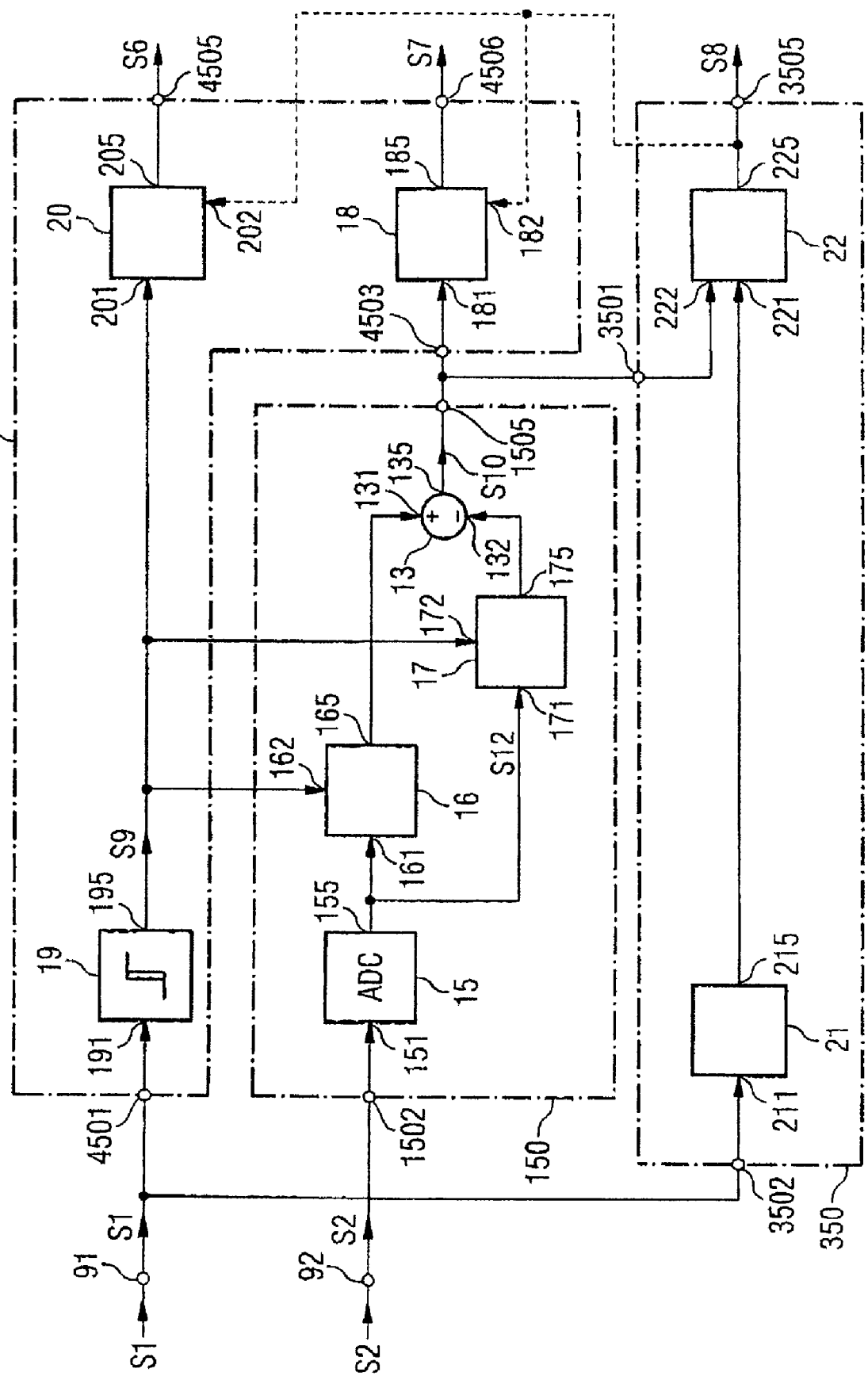
FIG. 5 shows a circuit diagram of a rotary encoder according to the invention.

A further exemplary embodiment of the circuit diagram of a rotary encoder according to the invention is illustrated in FIG. 5.

The rotary encoder in accordance with FIG. 5 has a first and a second input terminal 91, 92, to which a first rotational speed signal S1 and a first direction of rotation signal S2, respectively, are fed. From the second input terminal 92, the first direction of rotation signal S2 is fed to a second input 1502 of a phase determining unit 150 and is forwarded from there to an input 151 of an analogue-to-digital converter 15. The analogue-to-digital converter 15 converts the first direction of rotation signal S2 into a digital first direction of rotation signal S12, which is available at the output 155 of said converter.

The digital first direction of rotation signal S12 is fed to inputs 161, 171 of a first and second memory unit 16, 17, in which instantaneous values of the digital first direction of rotation signal can be stored. The memory units 16, 17 respectively have a second input 162, 172, via which the storage of the signal S12 present at the inputs 161, 171 is initiated.

In this case, the storage is effected in such a way that the digitised first direction of rotation signal S12 is stored at different instants in the first and second memory units 16, 17. The stored values are output at outputs 165, 175 of the first and second memory units 16, 17 and fed to inputs 131, 132 of a third subtractor 13, which forms a difference between the values stored in the memory units and provides the phase difference signal S10 at its output 135.

The instants at which the digitised first direction of rotation signal S12 is stored in the memory units 16, 17 are preferably ascertained by means of zero crossings, particularly preferably by means of successive zero crossings of the first rotational speed signal S1, which is present at a first input terminal 91 of the rotary encoder and is fed from there to the input 191 of a zero crossing detector 19. The signal value of the digital direction of rotation signal is stored for example in the first memory 16 in the case of a first zero crossing and in the second memory 17 in the case of a next zero crossing, in the first memory 16 again in the case of a further zero crossing, etc.

A signal S9 that initiates the storage operations is provided by means of a zero crossing detector 19. In the case of a zero crossing of the first rotational speed signal Si, the zero crossing detector 19 provides a signal pulse or a signal edge that is fed to the second inputs 162, 172 of the first and second memory units 16 and 17, respectively. The output signal S9 of the zero crossing detector 19 is preferably configured such that it can be discerned whether the associated zero crossing is a zero crossing in the case of a rising or falling first rotational speed signal S1.

This distinguishability makes it possible to drive the first and the second memory unit 16 and 17, respectively, such that the storage of the digitised first direction of rotation signal S12 in the memory units 16 and 17, respectively, is effected at different times. By way of example, the digitised first direction of rotation signal S12 may be stored in the first memory unit 16 at a first instant dependent on a first zero crossing of the first rotational speed signal S1, and in the second memory unit 17 at a second instant dependent on a second zero crossing of the first rotational speed signal S1. In this case, first instants are for example instants at which a zero crossing of a rising edge of the rotational speed signal S1 is present, and second instants are for example instants at which a zero crossing of a falling edge is present. The difference between signal values of the first direction of rotation signal S2 at such a first and second instant represents a measure of the phase difference between the first rotational speed signal S1 and the first direction of rotation signal S2.

The signal S9 present at the output 195 of the zero crossing detector 19 preferably has the same frequency as or twice the frequency of the first rotational speed signal S1, and thus contains an item of information about the rotational speed of the rotor. The output signal S9 of the zero crossing detector 19 is additionally fed to the input 201 of a signal generator 20, which provides a second rotational speed signal S6 at its output 205. The information about the rotational speed of the rotor may be ascertained for example by means of the frequency, the pulse duration, the duty ratio or the amplitude of the second rotational speed signal S6.

Furthermore, the rotary encoder comprises a second signal generator 18, the input 181 of which is connected to the output 135 of the third subtractor 13 and at which the phase difference signal S10 is thus present. This phase difference signal S10 contains, inter alia, the information about the direction of rotation of the rotor, so that the signal generator 18 provides a corresponding second direction of rotation signal S7 at its output 185. The direction of rotation of the rotor may be ascertained for example by means of a pulse duration, a duty ratio, a voltage level or a bit value in the second direction of rotation signal S7. The zero crossing detector 19, the first signal generator 20 and also the second signal generator 18 are constituent parts of a processing unit 450.

In order to determine whether the first rotational speed signal S1 and the first direction of rotation signal S2 are beset by a disturbance in the sense mentioned in the introduction, an assessment unit 350 is furthermore provided. The assessment unit 350 has a first input 3501, via which the phase difference signal S10 is fed to a second input 222 of an assessment module 22. The assessment module 22 determines whether or not the phase difference signal S10 exceeds or falls below predefined limit values.

The corresponding upper and lower limit values, respectively, may either be fixedly predefined and stored for example in the assessment module. It is likewise possible to choose said limit values in variable fashion, for example in a manner dependent on the frequency or, as in the present exemplary embodiment, in a manner dependent on the amplitude of the first rotational speed signal S1. For this purpose, the first rotational speed signal S1 is fed to the first input 211 of a unit 21 for ascertaining the upper and lower limit value, respectively, for the differential phase difference signal S10. Said unit 21, in a manner dependent on the first rotational speed signal S1 present at its input 211, determines a lower and upper limit value, respectively, for the phase difference between the first rotational speed signal S1 and the first direction of rotation signal S2 and provides these limit values at its output 215.

These limit values are fed to the first input 221 of the assessment module 22. The assessment module 22 is thus able to decide whether or not the phase difference signal S10 is in a permissible range. Depending on this it is possible for the assessment module 22 to generate a status signal S8 as described above.

A user can use the status signal S8 to identify whether or not a disturbance is present and whether or not the second rotational speed signal S6 that is output and the second direction of rotation signal S7 that is output correspond to expedient values.

Optionally, as illustrated by dashed lines in FIG. 5, provision is made for connecting the status signal 8 to second inputs 202 and 182 of the first and second signal generators 20 and 18, respectively, so that the signal generators 20, 18 can identify a disturbance present and suppress the outputting of the second rotational speed signal S6 and of the second direction of rotation signal S7, respectively.

Two or more of the signals that are output, second rotational speed signal S6, second direction of rotation signal S7 and status signal S8, may optionally also be output at a single output. By way of example, it is possible to output the second rotational speed signal S6 as a square-wave signal with a frequency correlated with the rotational speed and to output the direction of rotation by means of the duty ratio or the pulse duration of said square-wave signal.

In the case of the embodiments described hitherto, a first rotational speed signal S1 and also a first direction of rotation signal S2 have in each case been fed to a rotary encoder according to the invention. Optionally or as an alternative, however, it is likewise possible to provide in the rotary encoder a circuit corresponding to the circuit shown in FIG. 2, which generates the first rotational speed signal S1 and also the first direction of rotation signal S2 from the first, second and third phase signals 31, 32 and 33, respectively. In this case, instead of the first rotational speed signal S1 and the first direction of rotation signal S2, the first, second and third phase signals S3, S4 and S5, respectively, have to be fed to the rotary encoder.

The way in which, from a suitably chosen first rotational speed signal S1 and first direction of rotation signal S2, the phase difference between these signals can be determined by means of the circuit illustrated in FIG. 5 is shown below with reference to FIG. 6.

Figure 6:
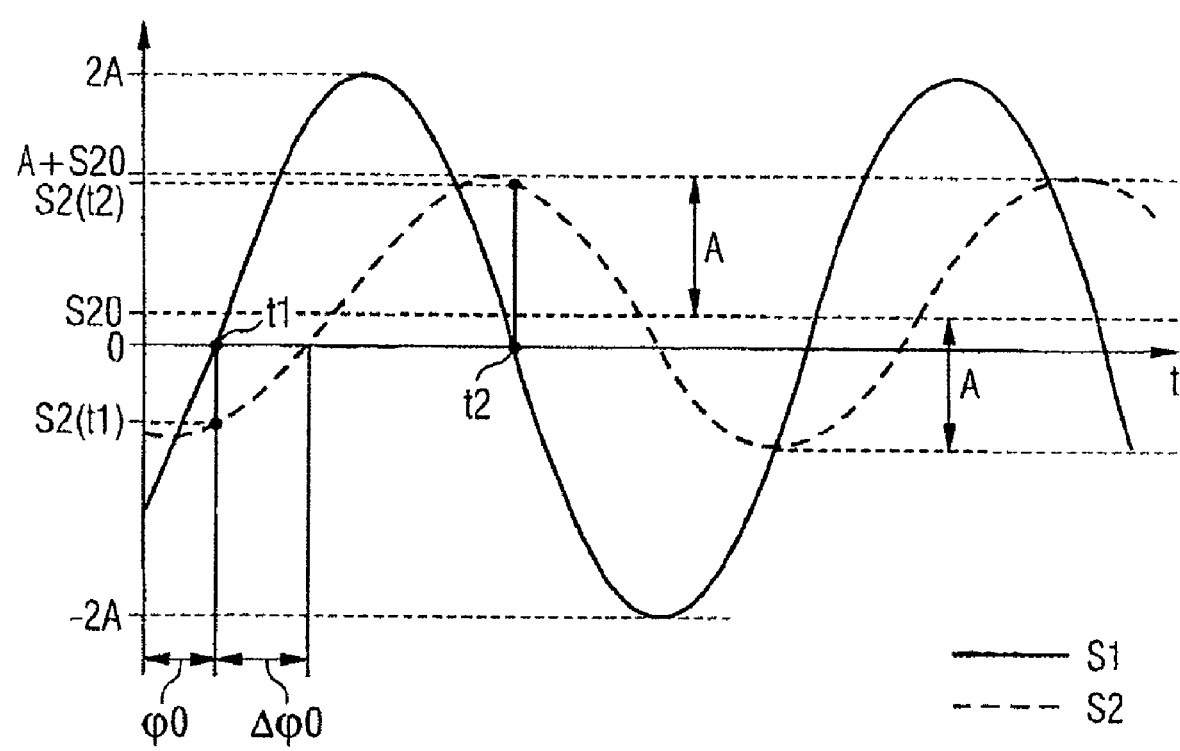
FIG. 6 illustrates by way of example the temporal profile of a rotational speed signal and of a direction of rotation signal, which are chosen in a suitable manner to determine the phase difference between said signals by means of the circuit illustrated in FIG. 5.

FIG. 6 shows a sinusoidal first rotational speed signal S1 with the amplitude 2A and zero crossings at the instants t1 and t2. In the time representation chosen, the first rotational speed signal S1 has a phase shift $\phi 0$ with respect to the time t=0. This results in the following profile as a function of the time t for the first rotational speed signal:

$$S1(t)=2 \cdot A \cdot \sin(\omega \cdot t - \phi 0) \quad (1)$$

In this case, $\omega$ is the angular frequency of the first rotational speed signal S1.

The first direction of rotation signal S2 is also sinusoidal and has the same angular frequency $\omega$, but only half the amplitude A in relation to the first rotational speed signal S1. Furthermore, the first direction of rotation signal S2 has a phase difference $\Delta\phi 0$ and also an offset S20 with respect to the first rotational speed signal S1. This results in the following profile as a function of the time t for the first direction of rotation signal:

$$S2(t)=2 \cdot A \cdot \sin(\omega \cdot t - \phi 0 - \Delta\phi 0) + S20 \quad (2)$$

By way of example, if the instants of the zero crossings in the case of a rising first rotational speed signal S1 are chosen as first instants t1 and the instants of the zero crossings in the case of a falling first rotational speed signal S1 are chosen as second instants t2, then the following relationships result from equation (1) for the instants of the zero crossings:

$$\omega \cdot t1 - \phi 0 = n \cdot \pi \quad (3)$$

$$\omega \cdot t2 - \phi 0 - \Delta\phi 0 = n \cdot \pi + m \cdot \pi \quad (4)$$

in this case, n is an integer and m is an odd integer. This ensures that the zero crossings of the first rotational speed signal S1 at the instant t1 are zero crossings of the rising rotational speed signal S1 and the zero crossings of the first rotational speed signal S1 at the instant t2 are zero crossings of the falling rotational speed signal S1, or vice versa.

If the relationships illustrated in equations (3) and (4) are used for calculating the difference between the signal values of the first direction of rotation signal S2 at a second and first instant t2 and t1, respectively, then the following results after a few conversion steps:

$$S2(t2)-S2(t1)=\pm 2 \cdot A \cdot \sin(\Delta\phi 0) \quad (5)$$

in this case, the sign of the sine function depends on whether n is even or odd. "+" holds true for an even n and "−" correspondingly holds true for an odd n.

There is thus a fixed relationship between the phase difference $\Delta\phi 0$ between the first rotational speed signal S1 and the first direction of rotation signal S2 and the difference between the signal values of the first direction of rotation signal S2 at the instants t1, t2. Consequently, the angular frequency $\omega$, which is correlated with the rotational speed of the rotor, and likewise the offset S20 and the phase shift $\phi 0$ do not have to be included in the determination of the phase difference $\Delta\phi 0$. Only the amplitudes 2A and A of the signals S1 and S2, respectively, are to be taken into account when determining the phase difference $\Delta\phi 2$.

If, as explained with reference to FIG. 5, the lower and/or upper limit values for the phase difference $\Delta\phi 0$ are determined by means of a unit 21 for ascertaining the upper and/or lower limit value, respectively, then the limit values are preferably likewise chosen in a manner dependent on the amplitudes 2A and A of the signals S1 and S2, respectively, or in a manner dependent on the frequency of the first rotational speed signal S1 or the frequency of the first direction of rotation signal S2.

| List of Reference Symbols | |
|---|---|
| 1 | Gearwheel |
| 2 | Tooth |
| 3 | Shaft |
| 4 | Rotary oscillation |
| 5 | Distance oscillation |
| 10 | First subtractor |
| 101, 102 | Subtractor inputs |
| 105 | Subtractor output |
| 11 | Adder |
| 111, 112 | Adder inputs |
| 115 | Adder output |
| 12 | Second subtractor |
| 121, 122 | Subtractor inputs |
| 125 | Subtractor output |
| 13 | Third subtractor |
| 131, 132 | Subtractor inputs |
| 135 | Subtractor output |
| 14 | Amplifier |
| 141 | Amplifier input |
| 145 | Amplifier output |
| 15 | Analogue-to-digital converter |
| 151 | Input of the analogue-to-digital converter |
| 155 | Output of the analogue-to-digital converter |
| 16 | First memory unit |

-continued

| List of Reference Symbols | |
|---|---|
| 161, 162 | Memory inputs |
| 17 | Second memory unit |
| 171, 172 | Memory inputs |
| 18 | Second signal generator |
| 181, 182 | Signal generator inputs |
| 185 | Signal generator output |
| 19 | Zero crossing detector |
| 20 | First signal generator |
| 201 | Signal generator inputs |
| 205 | Signal generator output |
| 21 | Limit value ascertaining unit |
| 211 | Input of the limit value ascertaining unit |
| 215 | Output of limit value ascertaining unit |
| 22 | Assessment module |
| 221, 222 | Assessment module inputs |
| 225 | Assessment module output |
| 31 | First signal source |
| 315 | Signal source output |
| 32 | Second signal source |
| 325 | Signal source output |
| 33 | Third signal source |
| 335 | Signal source output |
| 91 | First input terminal |
| 92 | Second input terminal |
| 100, 150 | Phase determining unit |
| 1001, 1002, 1501, 1502 | Inputs of the phase determining unit |
| 1005, 1505 | Output of the phase determining unit |
| 300, 350 | Assessment unit |
| 3001, 3501, 3502 | Input of the assessment unit |
| 3005, 3505 | Output of the assessment unit |
| 400, 450 | Processing unit |
| 4001, 4002, 4003, 4501, 4503 | Inputs of the processing unit |
| 4005, 4006 | Outputs of the phase determining unit |
| A | Amplitude |
| S1 | First rotational speed signal |
| S2 | First direction of rotation signal |
| S20 | Offset of the first direction of rotation signal |
| S3 | First phase signal |
| S4 | Second phase signal |
| S5 | Third phase signal |
| S6 | Second rotational speed signal |
| S7 | Second direction of rotation signal |
| S8 | Status signal |
| S9 | Output signal of the zero crossing detector |
| S10 | Phase difference signal |
| S12 | Digitised first direction of rotation signal |
| $\phi 0$ | Phase shift |
| $\Delta\phi 0, \Delta\phi 1, \Delta\phi 2$ | Phase differences |

The invention claimed is:

1. A method for detecting disturbances when determining a rotational speed of a rotor, the method comprising:
providing a first rotational speed signal representative of a rotational speed of the rotor;
providing a first direction of rotation signal representative of a direction of rotation of the rotor; and
determining a phase difference between the first rotational speed signal and the first direction of rotation signal.

2. The method of claim 1, further comprising:
detecting a disturbance when the phase difference falls below a lower limit value or exceeds an upper limit value.

3. The method of claim 2, wherein:
the lower limit value is at most approximately 70 degrees less than a desired phase difference; and
the upper limit value is at most approximately 70 degrees greater than the desired phase difference.

4. The method of claim 2, wherein the lower and upper limit values are based on the first rotational speed signal.

5. The method of claim 4, wherein the lower and upper limit values are based on an amplitude of the first rotational speed signal.

6. The method of claim 1, wherein the step of determining the phase difference further comprises:
ascertaining a first signal value for the first direction of rotation signal at a first instant, the first instant being ascertained at a zero crossing of the first rotational speed signal in a rising signal profile;
ascertaining a second signal value for the first direction of rotation signal at a second instant, the second instant being ascertained at a zero crossing of the first rotational speed signal in a falling signal profile; and
determining the difference between the first signal value and the second signal value.

7. The method according to claim 6, wherein the first and second instants are ascertained in successive zero crossings of the first rotational speed signal.

8. The method of claim 1, wherein the rotational speed signal is a sinusoidal signal.

9. The method of claim 1, further comprising:
providing a first signal source for generating a first phase signal corresponding to at least one rotation of a rotor;
providing a second signal source for generating a second phase signal corresponding to the at least one rotation of the rotor;
providing a third signal source for generating a third phase signal corresponding to the at least one rotation of the rotor;
generating the first rotational speed signal based on a difference between the first phase signal and the third phase signal;
generating the first direction of rotation signal based on a difference between the second phase signal and half of a sum of the first phase signal and the third phase signal.

10. A method for generating a signal containing information about a rotational speed or direction of a rotor, the method comprising:
providing a first rotational speed signal representing the rotational speed of a rotor;
providing a first direction of rotation signal representing the direction of rotation of the rotor;
detecting disturbances by analyzing a phase difference between the first rotational speed signal and the first direction rotation signal; and
in cases where no disturbance is detected, generating an output signal based on the first rotational speed signal or the first direction of rotation signal.

11. The method of claim 10, wherein the output signal comprises at least one of the group consisting of:
a second rotational speed signal based on the first rotational speed signal; and
a second direction of rotation signal based on the first direction of rotation signal.

* * * * *